United States Patent [19]
Tanaka et al.

[11] Patent Number: 5,917,603
[45] Date of Patent: Jun. 29, 1999

[54] WIPER CONTROL APPARATUS

[75] Inventors: Shuhei Tanaka; Tadashi Koyama; Keiji Tsunetomo, all of Osaka, Japan

[73] Assignee: Nippon Sheet Glass Co., Ltd., Osaka, Japan

[21] Appl. No.: 09/120,141

[22] Filed: Jul. 22, 1998

[30] Foreign Application Priority Data

Jul. 22, 1997 [JP] Japan ..................................... 9-195539

[51] Int. Cl.$^6$ .................................................. G01B 11/00
[52] U.S. Cl. ......................... 356/388; 356/445; 356/448; 356/343
[58] Field of Search ................................... 356/445, 448, 356/343, 338, 388

[56] References Cited

U.S. PATENT DOCUMENTS

| | | | |
|---|---|---|---|
| 3,971,956 | 7/1976 | Jakeman et al. | 356/445 |
| 5,414,518 | 5/1995 | Yazejian | 356/445 |

FOREIGN PATENT DOCUMENTS

2-67945  3/1990  Japan .

*Primary Examiner*—Frank G. Font
*Assistant Examiner*—Reginald A. Ratliff
*Attorney, Agent, or Firm*—Pillsbury Madison & Sutro LLP

[57] ABSTRACT

A wiper control apparatus of the water drop sensitive type for detecting of the amount of water or water drops adhering to or present upon the front surface of a windshield and for driving a wiper, comprising: a light emitting means for introducing light into the inside of the windshield so that the light experiences total internal reflection upon interior surfaces of the windshield; a light receiving means for receiving the light reflected within the windshield; means for turning a first output D1, a second output D2, and a third output D3 to either an H level or an L level in response to the level of a signal output from the light receiving means, the outputs being preset in sequence of height of sensitivity thereof; means for outputting a drive signal WD for the wiper when outputs D1, D2, and D3 are switched into the H level; means for maintaining the drive signal as long as the second output signal D2 is in the H level even if the third output D3 turns to the L level; and means for stopping the drive signal WD for the wiper when the second output D2 turns OFF.

6 Claims, 5 Drawing Sheets

WIPER CONTROL APPARATUS

BACKGROUND OF THE INVENTION

1. Field of the Invention

The present invention relates to a wiper control apparatus of the water drop sensitive type, which detects an amount of water drops adhering to or present upon a front surface of a windshield by using a light emitting element and a light receiving element so as to drive a wiper at a predetermined speed.

2. Description of the Related Art

As described in Japanese Laid-open Patent No. Hei 2-67945 (1990), there is already known a conventional wiper driver apparatus of a type which is sensitive to water drops, in which a light emitting means and a light receiving means are provided inside of a windshield (installed, typically on a vehicle like an automobile), disposed opposite to each other with a distance therebetween, in a wiping area swept by a wiper for wiping the outside surface of the windshield, whereby whether any water drops are adhering to or present upon the outside surface of the windshield or not is decided on the basis of the output level of a signal output from the light receiving means, and then the wiper is accordingly actuated.

The conventional wiper driver apparatus of the water drop sensitive type, however, is only actuated when the signal output from the detection means reaches a predetermined level, and therefore, it has a drawback in that it cannot promptly drive the wiper at a desired speed corresponding to the condition of water drops upon the windshield.

SUMMARY OF THE INVENTION

An object of the present invention, for resolving the drawback in the conventional art, is to provide a wiper control apparatus of the water drop sensitive type which can promptly drive the wiper at a desired speed which corresponds to the condition of water drops adhering to or present upon the windshield.

In accordance with the present invention, for resolving the drawback in the above-mentioned conventional art, there is provided a wiper control apparatus of the water drop sensitive type for detecting an amount of water drops adhering to or present upon a front surface of a windshield and for driving a wiper, comprising: a light emitting means for introducing light into the inside of said windshield so that the light experiences total internal reflection upon interior surfaces of said windshield; a light receiving means for receiving the light reflected within the windshield; means for turning ON and OFF a first output, a second output, and a third output in response to the level of an signal output from said light receiving means, said first, second, and third outputs being preset in sequence of height of sensitivity thereof; means for outputting a drive signal for said wiper when all of said outputs are received in the ON state; means for maintaining the drive signal as long as the second output signal is in the ON state even if said third output is turned OFF; and means for stopping the drive signal for said wiper when the second output turns OFF. Thereby, it is possible to drive the wiper at the desired speed corresponding to the condition of water drops adhering upon the windshield promptly.

Further, according to the present invention, there is also provided a wiper control apparatus of the water drop sensitive type for detecting an amount of water drops adhering to or present upon the front surface of a windshield and for driving a wiper, comprising: a light emitting means for introducing light into the inside of said windshield so that the light experiences total internal reflection upon interior surfaces of said windshield; a light receiving means for receiving the light reflected within the windshield; means for turning ON and OFF a first output, a second output, a third output, and a fourth output in response to the level of a signal output from said light receiving means, said first, second, third, and fourth outputs being preset in sequence of height of sensitivity thereof; means for outputting a drive signal for said wiper when all of the first, the second, and the third outputs are received in the ON state; means for driving said wiper at a high speed when the fourth output turns ON when said first, second, and third outputs are ON; means for maintaining the drive signal as long as the second output is in the ON state even if said third output is turned OFF; and means for stopping the drive signal for said wiper when the second output turns OFF.

Furthermore, according to the present invention, there is provided a wiper control apparatus of the water drop sensitive type as described above, wherein the time of turning OFF of the second output is freely changeable, and therefore, the time at which the second output is turned OFF can be adjusted, thereby enabling the amount (area) remaining to be swept by the wiper when it is stopped to be calculated.

Moreover, according to the present invention, there is provided a wiper control apparatus of the water drop sensitive type as described above, wherein the apparatus further comprises means for measuring a time difference between times when the first output and the third output turn ON, and means for driving said wiper at a high speed when the time difference is less than a predetermined value, thereby enabling the wiper to be promptly operated corresponding to the condition of water drops adhering to or present upon the windshield.

Furthermore, according to the present invention, there is provided a wiper control apparatus of the water drop sensitive type as described above, wherein the apparatus further comprises means for measuring a time difference between times when the first output and the second output turn ON, and means for driving said wiper at a high speed when the time difference is less than a predetermined value, thereby enabling the wiper to be promptly operated corresponding to the condition of water drops adhering to or present upon the windshield.

In addition, according to the present invention, there is provided a wiper control apparatus of the water drop sensitive type as described above, wherein the apparatus further comprises means for measuring a time difference between times when the second output and the third output turn ON, and means for driving said wiper at a high speed when the time difference is less than a predetermined value, thereby enabling the wiper to be promptly operated corresponding to the condition of water drops adhering to or present upon the windshield.

DESCRIPTION OF THE PREFERRED EMBODIMENTS

Hereinafter, detailed explanation of the embodiments according to the present invention will be given by referring to the attached drawings.

Figure 1:
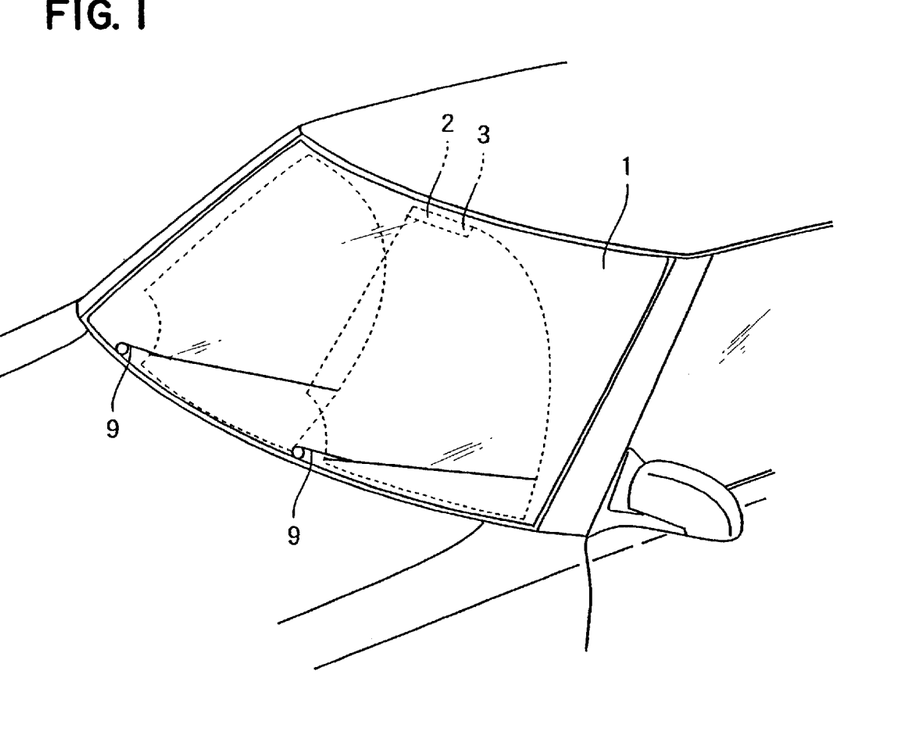
FIG. 1 is a perspective view showing a front part of an automobile to which is applied the wiper control apparatus according to the present invention.

As shown in FIG. 1, a rain sensor 2 is attached with an adhesive (i.e., adhesive tape) 3 to an interior surface of a windshield 1 of an automobile, within a region where an outside surface thereof is wiped by a wiper 9. As the adhesive (i.e., the adhesive tape) 3, there is selected one which has a refractive index almost equal to that of the windshield 1, (i.e. 1.48). Further, as the windshield 1, there is used a soda-lime glass substrate having a thickness of 5 mm, which mainly comprises $SiO_2$.

Figure 2:
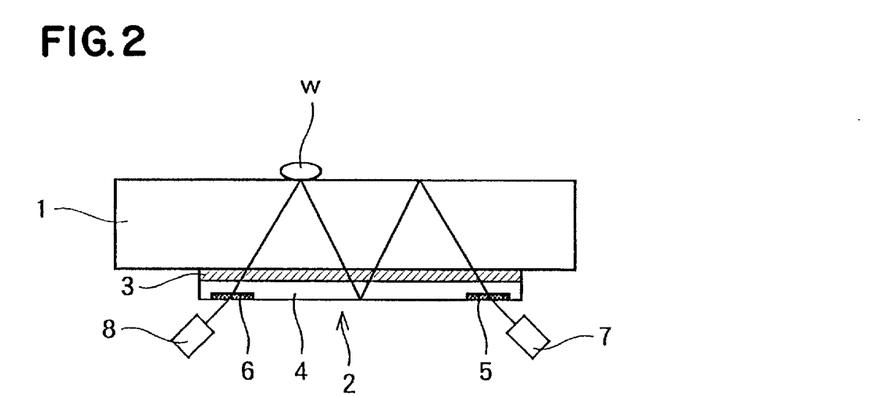
FIG. 2 shows the construction of a rain sensor, according to the present invention.

The rain sensor 2, as shown in FIG. 2, comprises diffraction gratings 5, 6 which are formed on a surface of the glass substrate 4 by a laser beam. Further, the adhesive 3 is pasted on the entire surface over the glass substrate 4, thereby closely contacting the rain sensor 2 and the windshield 1 to each other.

Furthermore, in the vicinity of one diffraction grating 5 there is provided a light emitting means 7, which comprises a light emitting element, such as a light emitting diode (LED) or a laser diode (LD) or the like, while in the vicinity of the other diffraction grating 6 there is provided a light receiving means 8, which comprises a light receiving element, such as a photo diode (PD) or the like. The light emitting means 7 and the light receiving means 8 can be provided closely contacted with the diffraction gratings 5, 6.

Moreover, the diffraction gratings 5, 6 are preferably formed directly on the surface of the glass substrate 4 through an ablation phenomenon by irradiating a laser beam thereupon.

The diffraction gratings comprise optical elements in which fine grooves are formed upon the surface of the glass. The pitch between the grooves is generally designed to be within the range from 0.4 to 3 µm, depending on the intended use thereof. A principal use of the diffraction grating is for spectrum separation of incident light. It can be used for separating or bending the light by an effect of the diffraction thereof in the case where monochromatic light is used as the light source.

Moreover, as a diffraction grating other than that mentioned above, for example, a diffraction grating of the reflection type, a slit-like diffraction grating, or further other diffraction gratings which change in refractive power periodically also can be used for the purposes of the invention.

Figure 3:
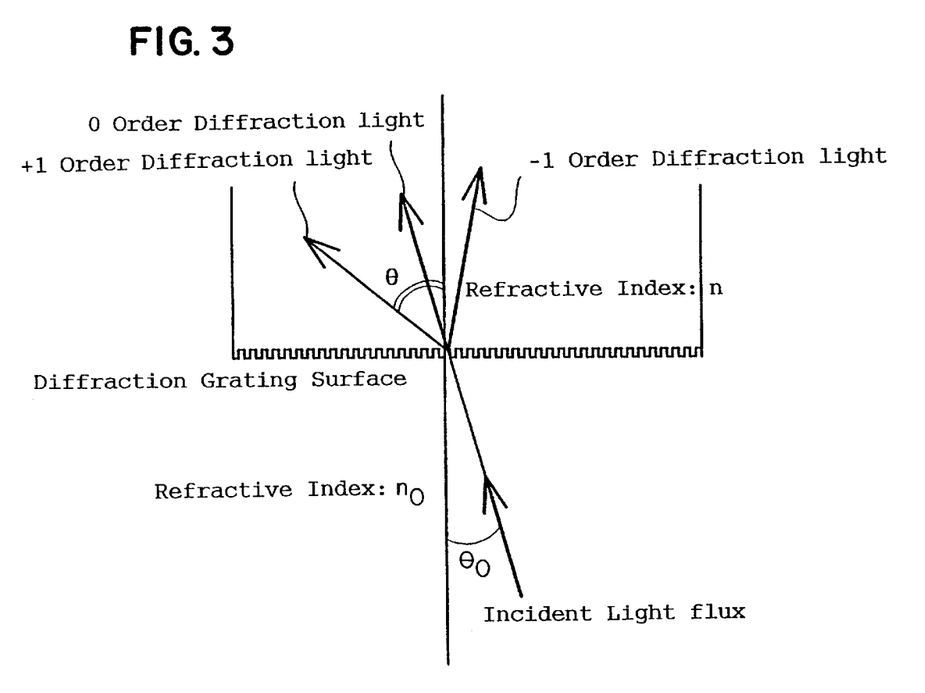
FIG. 3 explains the function of a diffraction grating, according to the present invention.

The present invention using the diffraction grating makes use of a phenomenon by which the diffracted light appears on the basis of a predetermined rule when monochromatic light is incident upon the diffraction grating. As shown in FIG. 3, the diffracted light generates a primary diffracted light (lobe) at a constant angle with respect to the incident light. Here, also diffracted light lobes of higher orders appear. However, since they are small in intensity, the light of the primary diffracted lobe is primarily used.

The angular relationship between the incident light and the diffracted light can be represented by the following equation when the incident light is incident upon the diffraction gating. Namely, assuming that the angle of the incident light is $\theta_0$, the angle of the diffracted light of m order $\theta$, the wavelength of the incident light $\lambda$, the pitch of the grooves d, the refractive index of the medium at the light exit side n, and the refractive index of the medium at the light incident side $n_0$, then the angular relationship is determined as below:

$$n\cdot\sin\theta - n_0\cdot\sin\theta_0 = m\lambda/d \ (m=0, \pm 1, \pm 2, \ldots) \tag{1}$$

In case the where the light incident side is air and the light exit side is a transparent glass plate, since $n_0=1.0$, the angle of the light propagating within the transparent plate can therefore be adjusted by changing the angle of the incident light onto the diffraction grating.

As mentioned above, by using the diffraction grating, it is possible to introduce light into the transparent plate at an arbitrary angle. Further, by appropriately selecting the incident angle of the light onto the diffraction grating, it is also possible to set it in such manner that the introduced light experiences total internal reflection within the transparent plate.

Further, it is also possible have the light which is propagating within the transparent plate under total internal reflection to exit into the air on the basis of the same principal mentioned above.

For obtaining the angle of the total internal reflection upon the boundary surface between the air and the glass, the following calculation is made using Snell's law. A general equation of Snell's law is shown in equation (2) indicated below:

$$n_0\cdot\sin\alpha_0 = n\cdot\sin\alpha \tag{2}$$

where, $\alpha$ and $\alpha_0$ define angles with respect to a normal on the boundary surface in the material of refractive index n and the material of refractive index $n_0$ ($\alpha$: incident angle, $\alpha_0$: angle of refraction).

In the case where the refractive index of the glass is n=1.48 as mentioned above, and the refractive index of the air $n_0=1$, the condition for obtaining total internal reflection within the glass plate is $\alpha_0=90°$. Therefore, an angle of $\alpha=42.5°$ can be obtained from equation (2). Accordingly, if the incident angle $\alpha$ is equal to or greater than this angle (i.e. 42.5°), total internal reflection occurs within the medium of the glass.

Moreover, in the case where water adheres to or is present upon the glass, the condition where total internal reflection occurs is that angle $\alpha$ is equal to 42.5° ($\alpha=64.0°$), by the same calculation. Accordingly, under the condition that the incident angle $\alpha$ is within the range from 42.5° to 64.0°, total internal reflection will occur within the glass plate when water adheres to or is present thereon, while total internal reflection will not occur when no water adheres thereto or is present thereon, i.e., the light reflecting inside the glass is simply transmitted outside through the water.

For causing the reflection, the incident angle upon the diffraction grating is adjusted. The incident angle upon the diffraction grating such that the reflection angle comes to be 42.5° within the glass is calculated by using the above-mentioned equation (1). Upon a diffraction grating formed on the glass surface with a period of 1020 nm, it comes to be 22° when a positive primary (+1) diffracted light (lobe) of 633 nm from He-Ne laser is applied.

For making the reflection angle 64.0° inside the glass, it is apparent that the incident angle upon the diffraction grating should be 45° from the same calculation. In the present embodiment, the light is incident upon the diffraction grating 5 at the angle 45°. At this time, the light which experiences the total internal reflection exits from the other diffraction grating 6.

Moreover, in the case where a water drop W adheres or is present at the point where one example of total internal reflection occurs, the light which exits from the diffraction grating 6 is reduced (intensity), and in the case where water drops adhere or are present at all of the total internal reflection points, the output light is reduced to one-fiftieth (1/50).

Namely, it can be ascertained that the presence of the water on the glass surface can be sensitively detected so as to be indicated by the strength of the exit light. Further, when gradually increasing the incident angle upon the diffraction grating 5, the same phenomenon occurs.

However, when the incident angle is greater than 64°, the amount of exiting light does not change even if water or water drops are present. This is almost coincident with the angle where the condition of causing the total internal reflection to occur inside the glass does not change even if the water adheres upon the surface.

Figure 4:
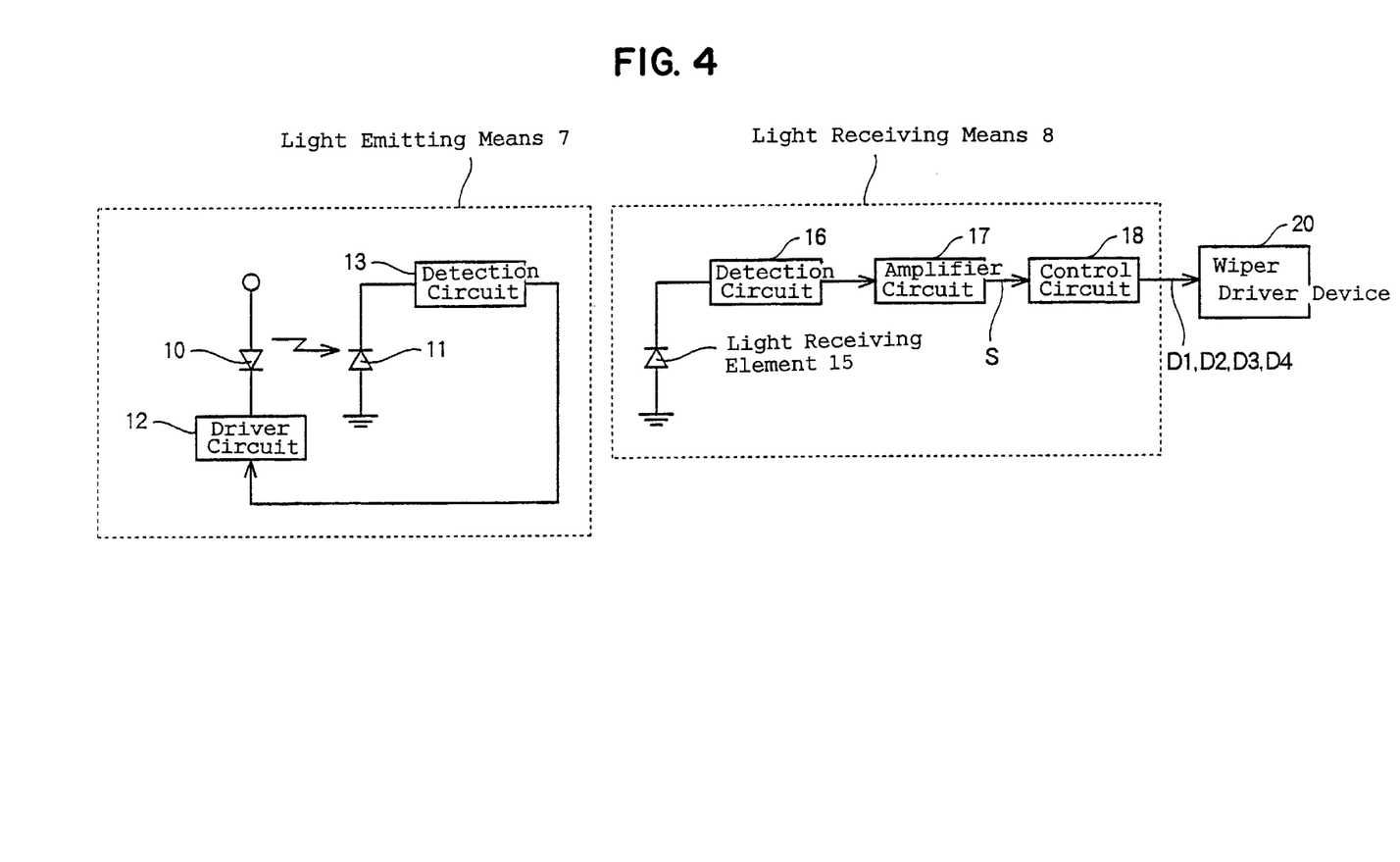
FIG. 4 shows the construction of the wiper control apparatus according to the present invention.

The wiper control apparatus of the water drop sensitive type according to the present invention, as shown in FIG. 4, is constructed with a rain sensor 2 which comprises a light emitting means 7 for introducing light into the windshield 1 so that the light experiences total internal reflection upon interior surfaces of the windshield 1, a light receiving means 8 for receiving the light reflected within the windshield 1, and a wiper driver device 20 for driving a wiper 9 at a desired speed with an signal output from the light receiving means 8.

The light emitting means 7 is constructed with a light emitting element 10, such as an LED or LD, a receiving light sensing element 11 for detecting the light output from the light emitting element 10, such as a PD, a driver circuit 12 for letting the light emitting element 10 output light which is modulated by a predetermined frequency, and a detection circuit 13 for outputting a signal corresponding to the modulated component from the signal output from the light sensing element 11.

Further, the signal output from the detection circuit 13 is fed back to the driver circuit 12 of the light emitting means 7.

The signal corresponding to the modulated component of the signal output from the light sensing element 11 is output through the detection circuit 13, and is fed back to the driver circuit 12 of the light emitting element 10 so as to control the light emission output of the light emitting element 10 at a desired value, thereby enabling the light emission output of the light emitting element 10 to be maintained at the desired value even if the ambient temperature around the light emitting means 7 changes.

The light receiving means 8 is constructed with a light receiving element 15, such as a PD, a detection circuit 16 for outputting a signal corresponding to the component which is modulated by the driver circuit 12 of the light emitting element 10 of the signal output from the light receiving element 15, an amplifier circuit 17 for amplifying the signal output from the detection circuit 16, and a control circuit 18 for processing the output signal S of the amplifier circuit 17 so as to switch (i.e. turn ON) three (3) signals, a first output signal D1, a second output signal D2, and a third output signal D3). The ON state corresponds to an H level (a high level) if it is positive in logic and to an L level (a low level) if negative in logic.

The detection circuit 16 outputs only the signal corresponding to the modulated component of the light emitting element 10 from the output of the light receiving element 15, and the signal is inputted through the amplifier circuit 17 and the control circuit 18 into the wiper driver device 20, thereby avoiding any malfunction caused by detecting ambient light, which can reach up to one hundred and fifty thousand (150,000) lux under strong sunshine in mid-summer, for instance, while it reaches only to several lux in darkness in the middle of the night.

The control circuit 18 sequentially compares the output signal S of the amplifier circuit 17 with a three-stage reference voltage, in other words, a first preset level R1, a second preset level R2, and a third preset level R3, in the order of height of voltage.

In the rain sensor 2 used in the present invention, as is mentioned above, the more that water drops adhere to or are present upon the front surface of the windshield 1, the lower the output level of the light receiving element 15. Therefore, the output signal S is at the highest voltage level when no water or water drops adhere to or are present on the front surface of the windshield 1, and is at the lowest voltage level when many water drops (or a lot of water) adhere to or are present upon the front surface of the windshield 1.

Also, the first output signal D1 is switched to the H level when the output signal S of the amplifier circuit 17 is smaller than the first preset level R1 (S<R1), the second output signal D2 is switched to the H level when the output signal S is smaller than the second preset level R2 (S<R2), and further the third output signal D3 is switched to the H level when the output signal S is smaller than the third preset level R3 (S<R3).

Here, in the case where the first output signal D1 is in the H level, it indicates a condition such that the rainfall (the source of the water adhering to or present upon the windshield) is a misty or drizzling rain, in the case where the second output signal D2 is in the H level, the rainfall is of a middle intensity, and in the case where the third output signal D3 is in the H level, it indicates that the rainfall is a heavy rain, respectively.

Figure 5:
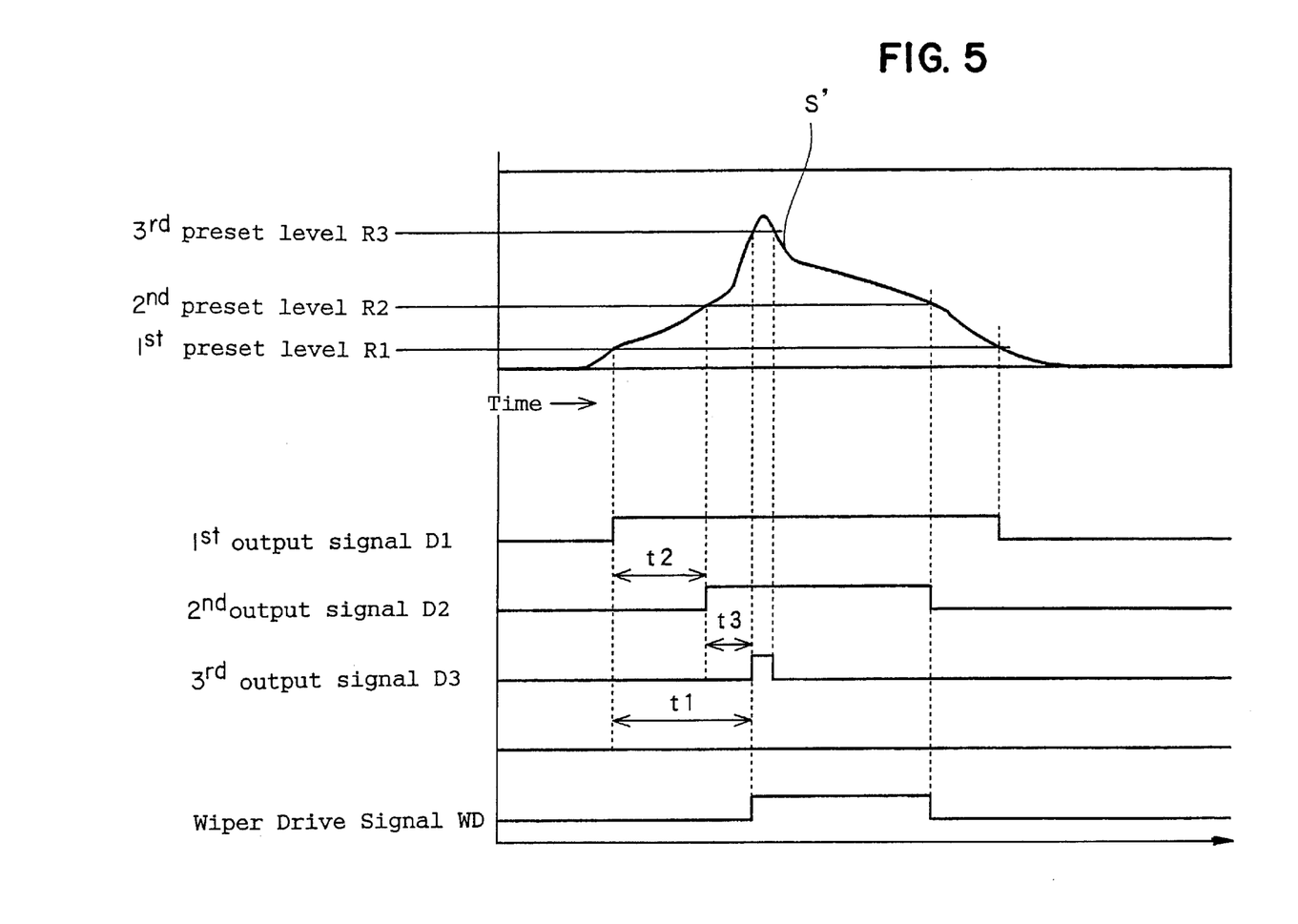
FIG. 5 is a timing-chart for showing operation of the wiper control apparatus according to the present invention.

The timing chart in FIG. 5 shows the ON-OFF conditions of output signals D1, D2, and D3 and a wiper drive signal WD with respect to an amount S' of rain drops adhering to or present upon the windshield 1, from a time when rain starts falling and the wiper 9 is initiated and continues to be driven until a time when the rain stops, in the case that the signal output from the control circuit 18 is divided into three (3) kinds, i.e. the first output signal D1, the second output signal D2, and the third output signal D3.

Here, the curve S' in FIG. 5 indicates variation in the amount of water (rain drops) adhering upon the windshield 1, and therefore it is coincident with the reverse of the output signal S' of the amplifier circuit 17.

As is shown in FIG. 5, when the rain starts, the amount S' of water (rain drops) begins to increase. Later, when it reaches the first preset level R1, the first output signal D1 turns to the H level, and then the amount S' of water (rain drops) increases to reach the second preset level R2, and the second output signal D2 turns to the H level. Further, when the amount S' of water (rain drops) increases to reach the third preset level R3, the third output signal D3 turns to the H level.

Also, when all of the output signals D1, D2, and D3 of the control circuit 18 turn to the H level, the drive signal WD for the wiper 9 is outputted and initiates the driving of the wiper. Thereafter, even if the third output signal turns to the L level, the drive signal WD for the wiper 9 continues to be outputted as long as the second output signal D2 is at the H level. When the second output signal D2 turns to the L level, the drive signal WD for the wiper 9 stops being outputted.

Accordingly, the wiper 9 begins the driving thereof at the time when the third output signal D3 turns (switches) to the H level, and it stops the driving thereof at the time when the second output signal D2 turns to the L level.

Further, as is shown in FIG. 5, the time difference t1 between the times when the first output signal D1 and the third output signal D3 turn to the H level is measured, and it is thereby possible to arrange such that the wiper 9 is driven at a high speed if the time difference t1 is equal to or greater than a predetermined value T1 (t1≦T1). This condition corresponds to a situation where the rain has abruptly changed into heavy rain.

Also, it is possible to arrange such that the wiper 9 is driven at the high speed if a time difference t2 is equal to or greater than a predetermined value T2 (t2≦T2), by measuring the time difference t2 between times when the first output signal D1 and the second output signal D2 switch to the H level.

Furthermore, it is also possible to arrange that the wiper 9 is driven at the high speed if a time difference t3 is equal to or greater than a predetermined value T3 (t3≦T3), by measuring the time difference t3 between times when the second output signal D2 and the third output signal D3 switch to the H level.

Further, by changing the second preset level R2 as a presettable reference voltage, the time when the second output signal D2 turns to the L level can be adjusted, thereby enabling the amount (area) remaining to be swept by the wiper when it is stopped to be calculated.

Figure 6:
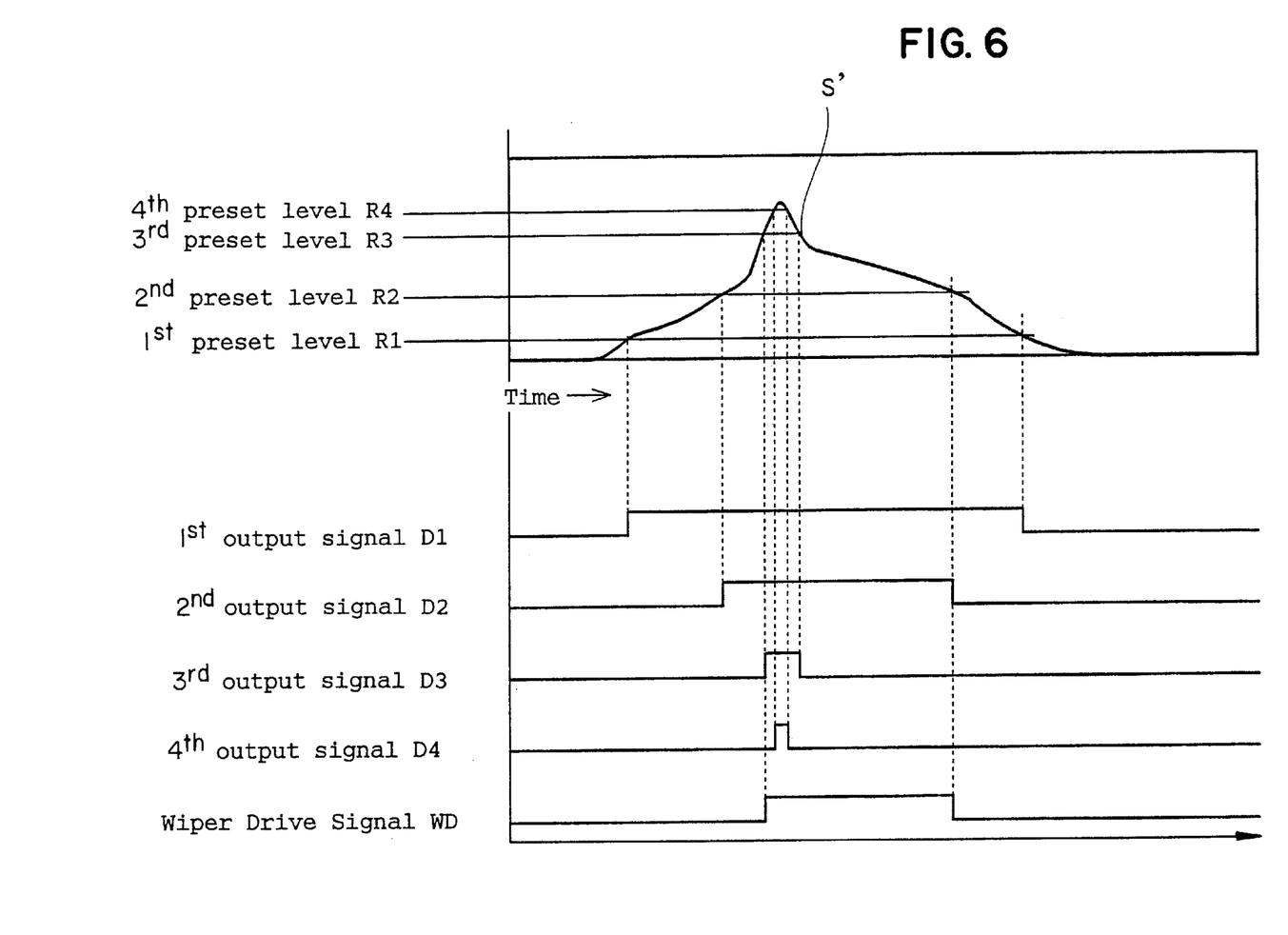
FIG. 6 is also a timing-chart for showing operation of the wiper control apparatus according to the present invention.

Next, operation will be explained in the case where the driving of the wiper 9 is controlled by a signal output from the amplifier circuit 17 which comprises four (4) output signals: a first output signal D1, a second output signal D2, a third output signal D3, and a fourth output signal D4.

In the control circuit 18, the output signal S from the amplifier circuit 17 is sequentially compared to the preset reference voltages (i.e., a first preset level R1, a second preset level R2, a third preset level R3, and a fourth preset level R4, in the order of voltage level from higher to lower).

In the case where the output signal S is smaller than the first preset level R1 (S<R1), the first output signal D1 switches to the H level, while in the case where the output signal S is smaller than the second preset level R2 (S<R2), the second output signal D2 turns to the H level. In the case where the output signal S is smaller than the third preset level R3 (S<R3), the third output signal D3 turns to the H level, and further, in the case where the output signal S is smaller than the fourth preset level R4 (S<R4), the fourth output signal D4 switches to the H level.

At this moment, when the first output signal D1 to the third output signal D3 are at the H level, this corresponds to the same rainfall condition mentioned above, while when the fourth output signal is at the H level, it corresponds to a rainfall condition which is still further heavier than the case when the third output signal is in the H level.

The timing chart in FIG. 6 shows the ON-OFF conditions of output signals D1, D2, D3, and D4 and a wiper drive signal WD with respect to the amount S' of water (rain drops) adhering to or present upon the windshield 1, from the time when rain starts falling and the wiper 9 is initiated and continues to be driven until the time when rain stops, in the case where the signal output from the control circuit 18 is divided into four (4) (i.e. a first output signal D1, a second output signal D2, a third output signal D3, and a fourth output signal D4.

Here, also the curve S' in FIG. 6 indicates variation in the amount of water (rain drops) adhering to or present upon the windshield 1, and therefore it is coincident with a reverse of the output signal S' of the amplifier circuit 17, in the same manner as shown in FIG. 5.

As is shown in FIG. 6, when the rain starts, the amount S' of water (rain drops) begins to increase. When it reaches the first preset level R1, the first output signal D1 turns to the H level, and then the amount S' of water increases to reach the second preset level R2, and the second output signal D2 switches to the H level. When the amount S' of rain drops increases to reach the third preset level R3, the third output signal D3 turns to the H level. Further, when the amount S' of rain drops increases to reach the fourth preset level R4, the fourth output signal D4 turns to the H level.

When the output signals D1, D2, and D3 of the control circuit 18 have switched to the H level, the drive signal WD for the wiper 9 is outputted and then initiates the driving thereof. Further, when the fourth output signal D4 turns to the H level, the wiper 9 is driven at high speed. Thereafter, even if the third output signal D3 switches to the L level, the drive signal WD for the wiper 9 continues to be outputted as long as the second output signal D2 is in the H level. In addition, when the second output signal D2 turns to the L level, the drive signal WD for the wiper 9 stops being outputted.

Accordingly, the wiper 9 begins to be driven at a time when the third output signal D3 switches to the H level, and it stops being driven when the second output signal D2 turns to the L level.

Further, while the fourth output signal D4 is at the H level, the wiper 9 is driven at the high speed.

Further, by changing the second preset level R2 as a presettable reference voltage, the time when the second output signal D2 switches to OFF can be adjusted, thereby enabling the amount (area) remaining to be swept by the wiper when it is stopped to be calculated.

The wiper control apparatus of the water drop sensitive type according to the present invention may be applied not only to the front windshield 1 but also to a rear windshield of an automobile.

In addition, it should be noted that although the invention is applied to the front windshield of an automobile, the invention may be applied to any glass shield that is exposed to the elements. Additionally, although water drops are recited as the object of detection, the water may be in a different form, for example a thin film, so long as the total internal reflection phenomenon can occur.

Finally, although it is recited that the invention is used to drive a wiper blade, it may, as shown in the figures, be used to drive two or more such blades.

What is claimed is:

1. A wiper control apparatus of the water drop sensitive type for detecting an amount of water drops adhering to or present upon a front surface of a windshield and for driving a wiper, comprising:

a light emitting means for introducing light into the inside of said windshield so that the light experiences total internal reflection upon interior surfaces of said windshield;

a light receiving means for receiving the light reflected within the windshield;

means for turning ON and OFF a first output, a second output, and a third output in response to a level of a signal output from said light receiving means, said first, second, and third outputs being preset in sequence of height of sensitivity thereof;

means for outputting a drive signal for said wiper when all of said outputs are received in the ON state;

means for maintaining the drive signal as long as the second output signal is in the ON state even if said third output is turned OFF; and means for stopping the drive signal for said wiper when the second output turns OFF.

2. A wiper control apparatus of the water drop sensitive type for detecting an amount of water drops adhering to or present upon a front surface of a windshield and for driving a wiper, comprising:

a light emitting means for introducing light into the inside of said windshield so that the light experiences total internal reflection upon interior surfaces of said windshield;

a light receiving means for receiving the light reflected within the windshield;

means for turning ON and OFF a first output, a second output, a third output, and a fourth output in response to a level of a signal output from said light receiving means, said first, second, third, and fourth outputs being preset in sequence of height of sensitivity thereof;

means for outputting a drive signal for said wiper when all of the first, the second, and the third outputs are received in the ON state;

means for driving said wiper at a high speed when the fourth output turns ON when said first, second, and third outputs are ON;

means for maintaining the drive signal as long as the second output is in the ON state even if the third output is turned OFF; and means for stopping the drive signal for said wiper when the second output turns OFF.

3. A wiper control apparatus of the water drop sensitive type as described in claim 1 or 2, wherein the time when the second output is turned off is freely changeable.

4. A wiper control apparatus of the water drop sensitive type as described in any one of claims 1 to 3, wherein said apparatus further comprises means for measuring a time difference between times when the first output and the third output turn ON, and means for driving said wiper at the high speed when the time difference is less than a predetermined value.

5. A wiper control apparatus of the water drop sensitive type as described in any one of claims 1 to 3, wherein said apparatus further comprises means for measuring a time difference between times when the first output and the second output turn ON, and means for driving said wiper at the high speed when the time difference is less than a predetermined value.

6. A wiper control apparatus of the water drop sensitive type as described in any one of claims 1 to 3, wherein said apparatus further comprises means for measuring a time difference between times when the second output and the third output turn ON, and means for driving said wiper at the high speed when the time difference is less than a predetermined value.

* * * * *